(12) United States Patent
Wei et al.

(10) Patent No.: US 11,500,101 B2
(45) Date of Patent: Nov. 15, 2022

(54) CURB DETECTION BY ANALYSIS OF REFLECTION IMAGES

(71) Applicant: TuSimple, Inc., San Diego, CA (US)

(72) Inventors: Yujie Wei, San Diego, CA (US); Xue Mei, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 749 days.

(21) Appl. No.: 16/401,772

(22) Filed: May 2, 2019

(65) Prior Publication Data

US 2019/0340447 A1 Nov. 7, 2019

Related U.S. Application Data

(60) Provisional application No. 62/665,994, filed on May 2, 2018.

(51) Int. Cl.
*G01S 17/89* (2020.01)
*G06K 9/62* (2022.01)
(Continued)

(52) U.S. Cl.
CPC ............ *G01S 17/89* (2013.01); *G01S 7/4808* (2013.01); *G01S 17/86* (2020.01); *G06K 9/6218* (2013.01); *G06V 20/588* (2022.01)

(58) Field of Classification Search
CPC ........ G01S 17/89; G01S 7/4808; G01S 17/86; G06K 9/6218; G06V 20/56; G06T 7/13; G06T 2207/10028; G06T 2207/30256
See application file for complete search history.

(56) References Cited

U.S. PATENT DOCUMENTS 6,084,870 A 7/2000 Wooten et al.
6,263,088 B1 7/2001 Crabtree
(Continued)

FOREIGN PATENT DOCUMENTS

CN 104463872 A 3/2015
CN 104850834 A 8/2015
(Continued)

OTHER PUBLICATIONS

Carle, Patrick J.F. et al. "Global Rover Localization by Matching Lidar and Orbital 3D Maps." IEEE, Anchorage Convention District, pp. 1-6, May 3-8, 2010. (Anchorage Alaska, US).
(Continued)

*Primary Examiner* — Marthe Y Marc-Coleman
(74) *Attorney, Agent, or Firm* — Paul Liu; Perkins Coie, LLP (57) ABSTRACT

Disclosed are devices, systems and methods for curb detection using light detection and ranging (LiDAR) sensors. One example of a method for curb detection includes acquiring, based on a scan of an area around a vehicle, a point-cloud frame that includes a description of an intensity of a reflection of the area around the vehicle, selecting a subset of points from the point-cloud frame, seeding each of a plurality of clusters based on the selected points, determining a criterion for each of the selected points, increasing a size of each of the plurality of clusters by including additional points from the point-cloud frame that meet the criterion for the corresponding cluster, identifying a largest cluster of the plurality of clusters upon completion of the increasing step, and detecting a curb based on a boundary of the largest cluster.

20 Claims, 6 Drawing Sheets

(51) Int. Cl.
  *G01S 7/48* (2006.01)
  *G01S 17/86* (2020.01)
  *G06V 20/56* (2022.01)

(56) References Cited

U.S. PATENT DOCUMENTS

| | | | |
|---|---|---|---|
| 6,594,821 B1 | 7/2003 | Banning et al. | |
| 6,777,904 B1 | 8/2004 | Degner | |
| 6,975,923 B2 | 12/2005 | Spriggs | |
| 7,103,460 B1 | 9/2006 | Breed | |
| 7,689,559 B2 | 3/2010 | Canright | |
| 7,742,841 B2 | 6/2010 | Sakai et al. | |
| 7,783,403 B2 | 8/2010 | Breed | |
| 7,844,595 B2 | 11/2010 | Canright | |
| 8,041,111 B1 | 10/2011 | Wilensky | |
| 8,064,643 B2 | 11/2011 | Stein | |
| 8,082,101 B2 | 12/2011 | Stein | |
| 8,164,628 B2 | 4/2012 | Stein | |
| 8,175,376 B2 | 5/2012 | Marchesotti | |
| 8,271,871 B2 | 9/2012 | Marchesotti | |
| 8,346,480 B2 | 1/2013 | Trepagnier et al. | |
| 8,378,851 B2 | 2/2013 | Stein | |
| 8,392,117 B2 | 3/2013 | Dolgov | |
| 8,401,292 B2 | 3/2013 | Park | |
| 8,412,449 B2 | 4/2013 | Trepagnier | |
| 8,478,072 B2 | 7/2013 | Aisaka | |
| 8,553,088 B2 | 10/2013 | Stein | |
| 8,706,394 B2 | 4/2014 | Trepagnier et al. | |
| 8,718,861 B1 | 5/2014 | Montemerlo et al. | |
| 8,788,134 B1 | 7/2014 | Litkouhi | |
| 8,908,041 B2 | 12/2014 | Stein | |
| 8,917,169 B2 | 12/2014 | Schofield | |
| 8,963,913 B2 | 2/2015 | Baek | |
| 8,965,621 B1 | 2/2015 | Urmson | |
| 8,981,966 B2 | 3/2015 | Stein | |
| 8,983,708 B2 | 3/2015 | Choe et al. | |
| 8,993,951 B2 | 3/2015 | Schofield | |
| 9,002,632 B1 | 4/2015 | Emigh | |
| 9,008,369 B2 | 4/2015 | Schofield | |
| 9,025,880 B2 | 5/2015 | Perazzi | |
| 9,042,648 B2 | 5/2015 | Wang | |
| 9,081,385 B1 | 7/2015 | Ferguson et al. | |
| 9,088,744 B2 | 7/2015 | Grauer et al. | |
| 9,111,444 B2 | 8/2015 | Kaganovich | |
| 9,117,133 B2 | 8/2015 | Barnes | |
| 9,118,816 B2 | 8/2015 | Stein | |
| 9,120,485 B1 | 9/2015 | Dolgov | |
| 9,122,954 B2 | 9/2015 | Srebnik | |
| 9,134,402 B2 | 9/2015 | Sebastian | |
| 9,145,116 B2 | 9/2015 | Clarke | |
| 9,147,255 B1 | 9/2015 | Zhang | |
| 9,156,473 B2 | 10/2015 | Clarke | |
| 9,176,006 B2 | 11/2015 | Stein | |
| 9,179,072 B2 | 11/2015 | Stein | |
| 9,183,447 B1 | 11/2015 | Gdalyahu | |
| 9,185,360 B2 | 11/2015 | Stein | |
| 9,191,634 B2 | 11/2015 | Schofield | |
| 9,214,084 B2 | 12/2015 | Grauer et al. | |
| 9,219,873 B2 | 12/2015 | Grauer et al. | |
| 9,233,659 B2 | 1/2016 | Rosenbaum | |
| 9,233,688 B2 | 1/2016 | Clarke | |
| 9,248,832 B2 | 2/2016 | Huberman | |
| 9,248,835 B2 | 2/2016 | Tanzmeister | |
| 9,251,708 B2 | 2/2016 | Rosenbaum | |
| 9,277,132 B2 | 3/2016 | Berberian | |
| 9,280,711 B2 | 3/2016 | Stein | |
| 9,282,144 B2 | 3/2016 | Tebay et al. | |
| 9,285,230 B1* | 3/2016 | Silver | G06V 20/588 |
| 9,286,522 B2 | 3/2016 | Stein | |
| 9,297,641 B2 | 3/2016 | Stein | |
| 9,299,004 B2 | 3/2016 | Lin | |
| 9,315,192 B1 | 4/2016 | Zhu | |
| 9,317,033 B2 | 4/2016 | Ibanez-guzman et al. | |
| 9,317,776 B1 | 4/2016 | Honda | |
| 9,330,334 B2 | 5/2016 | Lin | |
| 9,342,074 B2 | 5/2016 | Dolgov | |
| 9,347,779 B1 | 5/2016 | Lynch | |
| 9,355,635 B2 | 5/2016 | Gao | |
| 9,365,214 B2 | 6/2016 | Ben Shalom | |
| 9,383,753 B1* | 7/2016 | Templeton | G01S 17/42 |
| 9,399,397 B2 | 7/2016 | Mizutani | |
| 9,418,549 B2 | 8/2016 | Kang et al. | |
| 9,428,192 B2 | 8/2016 | Schofield | |
| 9,436,880 B2 | 9/2016 | Bos | |
| 9,438,878 B2 | 9/2016 | Niebla | |
| 9,443,163 B2 | 9/2016 | Springer | |
| 9,446,765 B2 | 9/2016 | Ben Shalom | |
| 9,459,515 B2 | 10/2016 | Stein | |
| 9,466,006 B2 | 10/2016 | Duan | |
| 9,476,970 B1 | 10/2016 | Fairfield | |
| 9,483,839 B1 | 11/2016 | Kwon | |
| 9,490,064 B2 | 11/2016 | Hirosawa | |
| 9,494,935 B2 | 11/2016 | Okumura et al. | |
| 9,507,346 B1 | 11/2016 | Levinson et al. | |
| 9,513,634 B2 | 12/2016 | Pack et al. | |
| 9,531,966 B2 | 12/2016 | Stein | |
| 9,535,423 B1 | 1/2017 | Debreczeni | |
| 9,538,113 B2 | 1/2017 | Grauer et al. | |
| 9,547,985 B2 | 1/2017 | Tuukkanen | |
| 9,549,158 B2 | 1/2017 | Grauer et al. | |
| 9,555,803 B2 | 1/2017 | Pawlicki | |
| 9,568,915 B1 | 2/2017 | Bemtorp | |
| 9,587,952 B1 | 3/2017 | Slusar | |
| 9,599,712 B2 | 3/2017 | Van Der Tempel et al. | |
| 9,600,889 B2 | 3/2017 | Boisson et al. | |
| 9,602,807 B2 | 3/2017 | Crane et al. | |
| 9,612,123 B1 | 4/2017 | Levinson et al. | |
| 9,620,010 B2 | 4/2017 | Grauer et al. | |
| 9,625,569 B2 | 4/2017 | Lange | |
| 9,628,565 B2 | 4/2017 | Stenneth et al. | |
| 9,649,999 B1 | 5/2017 | Amireddy et al. | |
| 9,652,860 B1 | 5/2017 | Maali | |
| 9,669,827 B1 | 6/2017 | Ferguson et al. | |
| 9,672,446 B1 | 6/2017 | Vallesi-Gonzalez | |
| 9,690,290 B2 | 6/2017 | Prokhorov | |
| 9,701,023 B2 | 7/2017 | Zhang et al. | |
| 9,712,754 B2 | 7/2017 | Grauer et al. | |
| 9,720,418 B2 | 8/2017 | Stenneth | |
| 9,723,097 B2 | 8/2017 | Harris | |
| 9,723,099 B2 | 8/2017 | Chen | |
| 9,723,233 B2 | 8/2017 | Grauer et al. | |
| 9,726,754 B2 | 8/2017 | Massanell et al. | |
| 9,729,860 B2 | 8/2017 | Cohen et al. | |
| 9,738,280 B2 | 8/2017 | Rayes | |
| 9,739,609 B1 | 8/2017 | Lewis | |
| 9,746,550 B2 | 8/2017 | Nath | |
| 9,753,128 B2 | 9/2017 | Schweizer et al. | |
| 9,753,141 B2 | 9/2017 | Grauer et al. | |
| 9,754,490 B2 | 9/2017 | Kentley et al. | |
| 9,760,837 B1 | 9/2017 | Nowozin et al. | |
| 9,766,625 B2 | 9/2017 | Boroditsky et al. | |
| 9,769,456 B2 | 9/2017 | You et al. | |
| 9,773,155 B2 | 9/2017 | Shotton et al. | |
| 9,779,276 B2 | 10/2017 | Todeschini et al. | |
| 9,785,149 B2 | 10/2017 | Wang et al. | |
| 9,805,294 B2 | 10/2017 | Liu et al. | |
| 9,810,785 B2 | 11/2017 | Grauer et al. | |
| 9,823,339 B2 | 11/2017 | Cohen | |
| 9,953,236 B1 | 4/2018 | Huang | |
| 10,147,193 B2 | 12/2018 | Huang | |
| 10,223,806 B1 | 3/2019 | Yi et al. | |
| 10,223,807 B1 | 3/2019 | Yi et al. | |
| 10,410,055 B2 | 9/2019 | Wang et al. | |
| 2003/0114980 A1 | 6/2003 | Klausner et al. | |
| 2003/0174773 A1 | 9/2003 | Ciu | |
| 2004/0264763 A1 | 12/2004 | Mas et al. | |
| 2007/0136408 A1 | 6/2007 | Wheeler et al. | |
| 2007/0183661 A1 | 8/2007 | El-Maleh | |
| 2007/0183662 A1 | 8/2007 | Wang | |
| 2007/0230792 A1 | 10/2007 | Shashua | |
| 2007/0286526 A1 | 12/2007 | Abousleman | |
| 2008/0249667 A1 | 10/2008 | Horvitz | |
| 2009/0040054 A1 | 2/2009 | Wang | |
| 2009/0087029 A1 | 4/2009 | Coleman | |

(56) References Cited

U.S. PATENT DOCUMENTS

| | | |
|---|---|---|
| 2010/0049397 A1 | 2/2010 | Lin |
| 2010/0111417 A1 | 5/2010 | Ward |
| 2010/0226564 A1 | 9/2010 | Marchesotti |
| 2010/0281361 A1 | 11/2010 | Marchesotti |
| 2011/0142283 A1 | 6/2011 | Huang |
| 2011/0206282 A1 | 8/2011 | Aisaka |
| 2011/0247031 A1 | 10/2011 | Jacoby |
| 2012/0041636 A1 | 2/2012 | Johnson et al. |
| 2012/0105639 A1 | 5/2012 | Stein |
| 2012/0140076 A1 | 6/2012 | Rosenbaum |
| 2012/0274629 A1 | 11/2012 | Baek |
| 2012/0314070 A1 | 12/2012 | Zhang et al. |
| 2013/0051613 A1 | 2/2013 | Bobbitt et al. |
| 2013/0083959 A1 | 4/2013 | Owechko |
| 2013/0182134 A1 | 7/2013 | Grundmann et al. |
| 2013/0204465 A1 | 8/2013 | Phillips et al. |
| 2013/0266187 A1 | 10/2013 | Bulan |
| 2013/0329052 A1 | 12/2013 | Chew |
| 2014/0072170 A1 | 3/2014 | Zhang |
| 2014/0104051 A1 | 4/2014 | Breed |
| 2014/0142799 A1 | 5/2014 | Ferguson et al. |
| 2014/0143839 A1 | 5/2014 | Ricci |
| 2014/0145516 A1 | 5/2014 | Hirosawa |
| 2014/0198184 A1 | 7/2014 | Stein |
| 2014/0321704 A1 | 10/2014 | Partis |
| 2014/0334668 A1 | 11/2014 | Saund |
| 2015/0062304 A1 | 3/2015 | Stein |
| 2015/0120244 A1 | 4/2015 | Ma |
| 2015/0269438 A1 | 9/2015 | Samarsekera et al. |
| 2015/0310370 A1 | 10/2015 | Burry |
| 2015/0353082 A1 | 12/2015 | Lee et al. |
| 2016/0008988 A1 | 1/2016 | Kennedy |
| 2016/0026787 A1 | 1/2016 | Nairn et al. |
| 2016/0037064 A1 | 2/2016 | Stein |
| 2016/0094774 A1 | 3/2016 | Li |
| 2016/0118080 A1 | 4/2016 | Chen |
| 2016/0129907 A1 | 5/2016 | Kim |
| 2016/0165157 A1 | 6/2016 | Stein |
| 2016/0210528 A1 | 7/2016 | Duan |
| 2016/0275766 A1 | 9/2016 | Venetianer et al. |
| 2016/0321381 A1 | 11/2016 | English |
| 2016/0334230 A1 | 11/2016 | Ross et al. |
| 2016/0342837 A1 | 11/2016 | Hong et al. |
| 2016/0347322 A1 | 12/2016 | Clarke et al. |
| 2016/0375907 A1 | 12/2016 | Erban |
| 2017/0053169 A1 | 2/2017 | Cuban et al. |
| 2017/0061632 A1 | 3/2017 | Linder et al. |
| 2017/0124476 A1 | 5/2017 | Levinson et al. |
| 2017/0134631 A1 | 5/2017 | Zhao et al. |
| 2017/0177951 A1 | 6/2017 | Yang et al. |
| 2017/0301104 A1 | 10/2017 | Qian |
| 2017/0305423 A1 | 10/2017 | Green |
| 2017/0318407 A1 | 11/2017 | Meister |
| 2018/0151063 A1 | 5/2018 | Pun |
| 2018/0158197 A1 | 6/2018 | Dasgupta |
| 2018/0260956 A1 | 9/2018 | Huang |
| 2018/0283892 A1 | 10/2018 | Behrendt |
| 2018/0373980 A1 | 12/2018 | Huval |
| 2019/0025853 A1 | 1/2019 | Julian |
| 2019/0065863 A1 | 2/2019 | Luo et al. |
| 2019/0066329 A1 | 2/2019 | Yi et al. |
| 2019/0066330 A1 | 2/2019 | Yi et al. |
| 2019/0066344 A1 | 2/2019 | Yi et al. |
| 2019/0108384 A1 | 4/2019 | Wang et al. |
| 2019/0132391 A1 | 5/2019 | Thomas |
| 2019/0132392 A1 | 5/2019 | Liu |
| 2019/0210564 A1 | 7/2019 | Han |
| 2019/0210613 A1 | 7/2019 | Sun |
| 2019/0236950 A1 | 8/2019 | Li |
| 2019/0266420 A1 | 8/2019 | Ge |

FOREIGN PATENT DOCUMENTS

| | | |
|---|---|---|
| CN | 105354829 A | 2/2016 |
| CN | 105957076 A | 9/2016 |
| CN | 106340197 A | 1/2017 |
| CN | 106778749 A | 5/2017 |
| CN | 106781591 A | 5/2017 |
| CN | 108010360 A | 5/2018 |
| CN | 109685821 A | 4/2019 |
| DE | 2608513 A1 | 9/1977 |
| EP | 890470 B1 | 1/1999 |
| EP | 1754179 A1 | 2/2007 |
| EP | 2448251 A2 | 5/2012 |
| EP | 2463843 A2 | 6/2012 |
| EP | 2761249 A1 | 8/2014 |
| EP | 2946336 A2 | 11/2015 |
| EP | 2993654 A1 | 3/2016 |
| EP | 3081419 A1 | 10/2016 |
| KR | 100802511 A1 | 2/2008 |
| WO | 1991009375 A1 | 6/1991 |
| WO | 2005098739 A1 | 10/2005 |
| WO | 2005098751 A1 | 10/2005 |
| WO | 2005098782 A1 | 10/2005 |
| WO | 2010109419 A | 9/2010 |
| WO | 2013045612 A1 | 4/2013 |
| WO | 2014111814 A1 | 7/2014 |
| WO | 2014166245 A1 | 10/2014 |
| WO | 2014201324 A1 | 12/2014 |
| WO | 2015083009 A1 | 6/2015 |
| WO | 2015103159 A1 | 7/2015 |
| WO | 2015125022 A2 | 8/2015 |
| WO | 2015186002 A2 | 12/2015 |
| WO | 2016090282 A1 | 6/2016 |
| WO | 2016135736 A2 | 9/2016 |
| WO | 2017079349 A1 | 5/2017 |
| WO | 2017079460 A2 | 5/2017 |
| WO | 2017013875 A1 | 5/2018 |
| WO | 2019040800 A1 | 2/2019 |
| WO | 2019084491 A1 | 5/2019 |
| WO | 2019084494 A1 | 5/2019 |
| WO | 2019140277 A2 | 7/2019 |
| WO | 2019168986 A1 | 9/2019 |

OTHER PUBLICATIONS

Caselitz, T. et al., "Monocular camera localization in 3D LiDAR maps," European Conference on Computer Vision (2014) Computer Vision—ECCV 2014. ECCV 2014. Lecture Notes in Computer Science, vol. 8690, pp. 1-6, Springer, Cham.

Mur-Artal, R. et al., "ORB-SLAM: A Versatile and Accurate Monocular SLAM System," IEEE Transaction on Robotics, Oct. 2015, pp. 1147-1163, vol. 31, No. 5, Spain.

Sattler, T. et al., "Are Large-Scale 3D Models Really Necessary for Accurate Visual Localization?" CVPR, IEEE, 2017, pp. 1-10.

Engel, J. et la. "LSD-SLAM: Large Scare Direct Monocular SLAM," pp. 1-16, Munich.

Levinson, Jesse et al., Experimental Robotics, Unsupervised Calibration for Multi-Beam Lasers, pp. 179-194, 12th Ed., Oussama Khatib, Vijay Kumar, Gaurav Sukhatme (Eds.) Springer-Verlag Berlin Heidelberg 2014.

Geiger, Andreas et al., "Automatic Camera and Range Sensor Calibration using a single Shot", Robotics and Automation (ICRA), pp. 1-8, 2012 IEEE International Conference.

Zhang, Z. et al. A Flexible new technique for camera calibration. IEEE Transactions on Pattern Analysis and Machine Intelligence (vol. 22, Issue: 11, pp. 1-5, Nov. 2000).

Bar-Hillel, Aharon et al. "Recent progress in road and lane detection: a survey." Machine Vision and Applications 25 (2011): pp. 727-745.

Schindler, Andreas et al. "Generation of high precision digital maps using circular arc splines," 2012 IEEE Intelligent Vehicles Symposium, Alcala de Henares, 2012, pp. 246-251. doi: 10.1109/IVS. 2012.6232124.

Hou, Xiaodi and Zhang, Liqing, "Saliency Detection: A Spectral Residual Approach", Computer Vision and Pattern Recognition, CVPR'07—IEEE Conference, pp. 1-8, 2007.

Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.

(56) References Cited

OTHER PUBLICATIONS

Hou, Xiaodi and Zhang, Liqing, "Dynamic Visual Attention: Searching For Coding Length Increments", Advances in Neural Information Processing Systems, vol. 21, pp. 681-688, 2008.
Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.
Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.
Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.
Hou, Xiaodi and Zhang, Liqing, "Color Conceptualization", Proceedings of the 15th ACM International Conference on Multimedia, pp. 265-268, ACM, 2007.
Hou, Xiaodi and Zhang, Liqing, "Thumbnail Generation Based on Global Saliency", Advances in Cognitive Neurodynamics, ICCN 2007, pp. 999-1003, Springer Netherlands, 2008.
Hou, Xiaodi et al., "A Meta-Theory of Boundary Detection Benchmarks", arXiv preprint arXiv: 1302.5985, pp. 1-4, 2013.
Li, Yanghao et al., "Revisiting Batch Normalization for Practical Domain Adaptation", arXiv preprint arXiv: 1603.04779, pp. 1-12, 2016.
Li, Yanghao and Wang, Naiyan and Liu, Laying and Hou, Xiaodi, "Demystifying Neural Style Transfer", arXiv preprint arXiv: 1701.01036, pp. 1-8, 2017.
Hou, Xiaodi and Zhang, Liqing, "A Time-Dependent Model of Information Capacity of Visual Attention", International Conference on Neural Information Processing, pp. 127-136, Springer Berlin Heidelberg, 2006.
Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv: 1702.08502, pp. 1-10, 2017.
Li, Yanghao and Wang, Naiyan and Liu, Laying and Hou, Xiaodi, "Factorized Bilinear Models for Image Recognition", arXiv preprint arXiv: 1611.05709, pp. 1-9, 2016.
Hou, Xiaodi, "Computational Modeling and Psychophysics in Low and Mid-Level Vision", California Institute of Technology, pp. 1-125, 2014.
Spinello, Luciano, Triebel, Rudolph, Siegwart, Roland, "Multiclass Multimodal Detection and Tracking in Urban Environments", Sage Journals, vol. 29 Issue 12, pp. 1498-1515 (pp. 1-18), Article first published online: Oct. 7, 2010; Issue published: Oct. 1, 2010.
Barth, Matthew et al., "Recent Validation Efforts for a Comprehensive Modal Emissions Model", Transportation Research Record 1750, Paper No. 01-0326, College of Engineering, Center for Environmental Research and Technology, University of California, Riverside, CA 92521, pp. 1-11, date unknown.
Ahn, Kyoungho, Hesham Rakha, "The Effects of Route Choice Decisions on Vehicle Energy Consumption and Emissions", Virginia Tech Transportation Institute, Blacksburg, VA 24061, pp. 1-34, date unknown.
Ramos, Sebastian, et al., "Detecting Unexpected Obstacles for Self-Driving Cars: Fusing Deep Learning and Geometric Modeling", arXiv: 1612.06573v1 [cs.CV] pp. 1-8, Dec. 20, 2016.
Schroff, Florian, Dmitry Kalenichenko, James Philbin, (Google), "FaceNet: A Unified Embedding for Face Recognition and Clustering", CVPR, pp. 1-10, 2015.
Dai, Jifeng, Kaiming He, Jian Sun, (Microsoft Research), "Instance-aware Semantic Segmentation via Multi-task Network Cascades", CVPR, pp. 1, 2016.
Huval, Brody et al., "An Empirical Evaluation of Deep Learning on Highway Driving", arXiv: 1504.01716v3 [cs.RO] pp. 1-7, Apr. 17, 2015.
Li, Tian, "Proposal Free Instance Segmentation Based on Instance-aware Metric", Department of Computer Science, Cranberry-Lemon University, Pittsburgh, PA., pp. 1-2, date unknown.
Norouzi, Mohammad, et al., "Hamming Distance Metric Learning", Departments of Computer Science and Statistics, University of Toronto, pp. 1-9, date unknown.
Jain, Suyong Dutt, Grauman, Kristen, "Active Image Segmentation Propagation", In Proceedings of the IEEE Conference on Computer Vision and Pattern Recognition (CVPR), Las Vegas, pp. 1-10, Jun. 2016.
MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), pp. 1-8, 2014.
Kendall, Alex, Gal, Yarin, "What Uncertainties Do We Need in Bayesian Deep Learning for Computer Vision", arXiv: 1703.04977v1 [cs.CV] pp. 1-11, Mar. 15, 2017.
Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, pp. 1-6, Jun. 21-24, 2010.
Welinder, Peter, et al., "The Multidimensional Wisdom of Crowds" http://www.vision.caltech.edu/visipedia/papers/WelinderEtaINIPS10.pdf, pp. 1-9, 2010.
Yu, Kai et al., "Large-scale Distributed Video Parsing and Evaluation Platform", Center for Research on Intelligent Perception and Computing, Institute of Automation, Chinese Academy of Sciences, China, arXiv:1611.09580v1 [cs.CV], pp. 1-7, Nov. 29, 2016.
Guameri, P. et al., "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.
C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.
Richter, Stephan R. et al., "Playing for Data: Ground Truth from Computer Games", Intel Labs, European Conference on Computer Vision (ECCV), Amsterdam, the Netherlands, pp. 1-16, 2016.
Athanasiadis, Thanos, et al., "Semantic Image Segmentation and Object Labeling", IEEE Transactions on Circuits and Systems for Video Technology, vol. 17, No. 3, pp. 1-15, Mar. 2007.
Cordts, Marius et al., "The Cityscapes Dataset for Semantic Urban Scene Understanding", Proceedings of the IEEE Computer Society Conference on Computer Vision and Pattern Recognition (CVPR), Las Vegas, Nevada, pp. 1-29, 2016.
Somani, Adhira et al., "DESPOT: Online POMDP Planning with Regularization", Department of Computer Science, National University of Singapore, pp. 1-9, date unknown.
Paszke, Adam et al., Enet: A deep neural network architecture for real-time semantic segmentation. CoRR, abs/1606.02147, pp. 1-10, 2016.
Szeliski, Richard, "Computer Vision: Algorithms and Applications" http://szeliski.org/Book/, pp. 1-2, 2010.
Moreira, Adriano, "Concave HuLL: A K-Nearest Enighbours Approach for the Computation of the Region Occupied by a Set of Points", International Conference on Computer Graphis Theory and Applications, (GRAPP), Barcelona, Spain, Mar. 8-11, 2007, pp. 1-8.
Chinese Application No. 201910337021.5, First Office Action dated Aug. 4, 2021, pp. 1-14.
Chinese Patent Office, First Office Action for CN 201910337021.5, dated Mar. 2, 2022, 25 pages with machine translation.
Chinese Application 201910337021.5 Notice of Grant dated Aug. 5, 2022 pp. (6 pages).

\* cited by examiner

CURB DETECTION BY ANALYSIS OF REFLECTION IMAGES

CROSS-REFERENCE TO RELATED APPLICATIONS

This patent document claims priority to and benefits of U.S. Provisional Patent Application No. 62/665,994, entitled "CURB DETECTION BY ANALYSIS OF REFLECTION IMAGES," filed on May 2, 2018. The entire content of the above patent application is incorporated by reference as part of the disclosure of this patent document.

TECHNICAL FIELD

This document relates to computer-based estimation of roadside curbs by image analysis.

BACKGROUND

Autonomous vehicle navigation is a technology for sensing the position and movement of a vehicle and, based on the sensing, autonomously control the vehicle to navigate towards a destination. Autonomous vehicle navigation can have important applications in transportation of people, goods and services. One of the components of autonomous driving, which ensures the safety of the vehicle and its passengers, as well as people and property in the vicinity of the vehicle, is curb detection.

SUMMARY

Disclosed are devices, systems and methods for curb detection by analyzing images of an area surrounding a vehicle. In some embodiments, light detection and ranging (LiDAR) sensors may be used to acquire the images based on reflections captured from the surrounding area. One example implementation can locate the curb position in 3D space accurately and robustly, using point-cloud data captured by a top-mounted LiDAR sensor as input, and output a predicted curve indicating the curb's position that can further be used for autonomous navigation of the vehicle.

In one aspect, the disclosed technology can be used to provide a method for curb detection using LiDAR sensors. This method includes acquiring, based on a scan of an area around a vehicle, a point-cloud frame that includes a description of an intensity of a reflection of the area around the vehicle, selecting a subset of points from the point-cloud frame, seeding each of a plurality of clusters based on the selected points, determining a criterion for each of the selected points, increasing a size of each of the plurality of clusters by including additional points from the point-cloud frame that meet the criterion for the corresponding cluster, identifying a largest cluster of the plurality of clusters upon completion of the increasing step, and detecting a curb based on a boundary of the largest cluster.

In another aspect, the above-described method is embodied in the form of processor-executable code and stored in a computer-readable program medium.

In yet another aspect, a device that is configured or operable to perform the above-described method is disclosed. The device may include a processor that is programmed to implement this method.

The above and other aspects and features of the disclosed technology are described in greater detail in the drawings, the description and the claims.

DETAILED DESCRIPTION

A curb usually refers to an edge where a raised sidewalk meets a street or roadway. In other words, the curb typically reveals the boundary of the drivable area of the road. An accurate and robust curb detection is useful to an autonomous driving system to ensure safe and lawful driving of a vehicle. LiDAR-based curb detection has been an active area of research and implementation in remote sensing and autonomous driving in recent years. For example, curb detection is also useful for autonomous trucks, which typically travel on highways from an origin distribution center to a destination distribution center, but necessarily travel through surface streets for the last mile at the start and end of their journey.

Conventional curb detection implementations use single or accumulated point-cloud frames as input, and employ pointwise features, such as height difference or LiDAR ring radius compression, to detect the curb. However, these conventional methods are focused on directly detecting the curbs, and are therefore susceptible to "curb-like" noises like vehicles on the road or bushes on the roadside.

LiDAR-based curb detection methods face many challenges. For example, most of the curb features (e.g. height difference, ring radius compression, and normal change) become weaker (more difficult to distinguish) when the curb is far away from the sensor. Furthermore, the methods must contend with occlusions and roadside objects having similar features to curbs, and the diversity of curb types that may require laborious parameter tuning in any conventional curb detection method.

Embodiments of the disclosed technology can locate the position of the curb in 3D space based on (a) detecting the curb using road surface expansion to find the boundary of the road instead of directly detecting the curb itself, which is advantageously robust to the noise and occlusions from the road surface, and (b) combining multiple features for robust point clustering.

Figure 1:
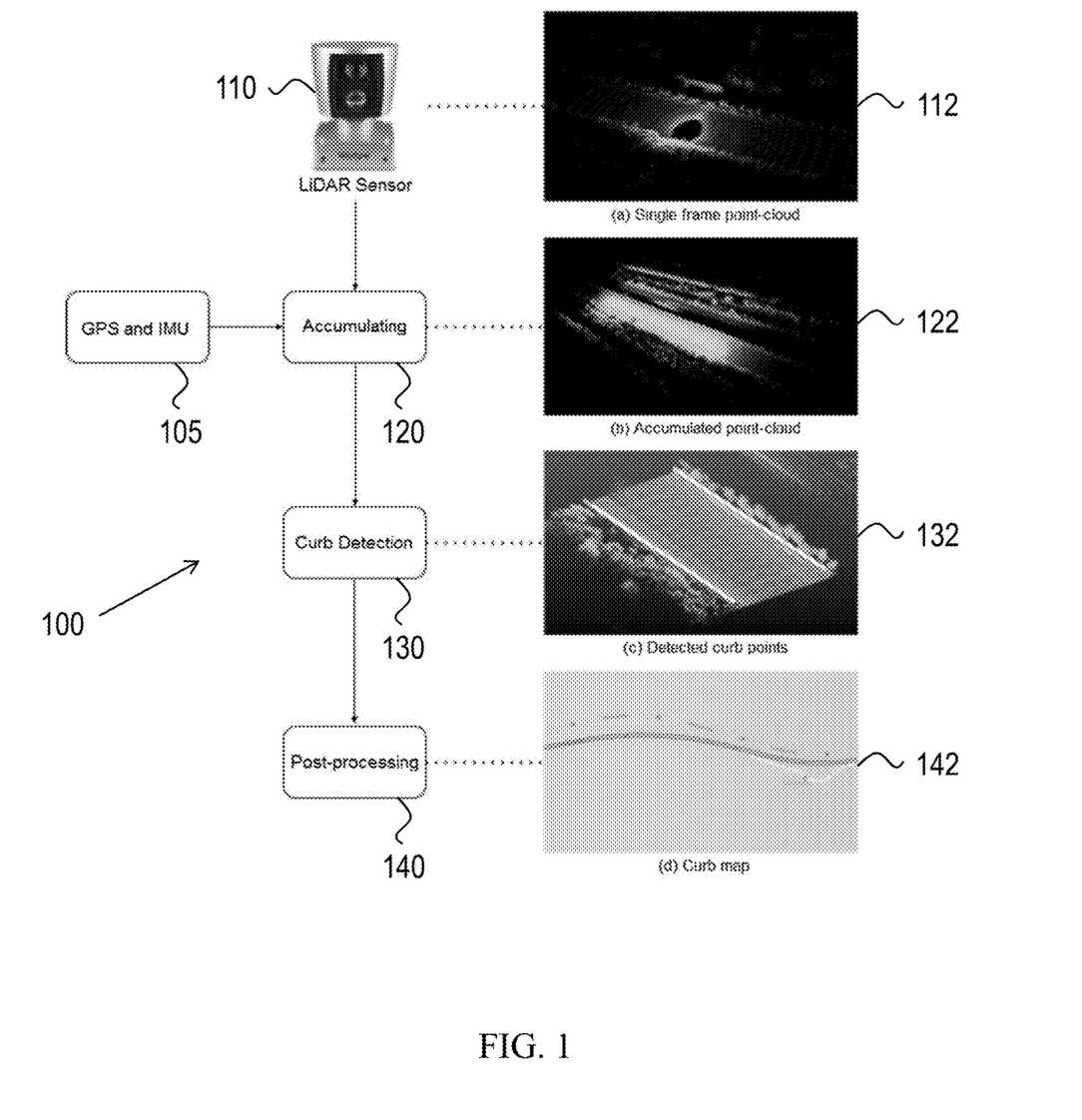
FIG. 1 shows an annotated flow diagram of an example method for LiDAR-based curb detection.

FIG. 1 shows an annotated flow diagram of an example method for LiDAR-based curb detection. The flow diagram 100 includes using a LiDAR sensor (block 110) mounted on top of a vehicle, which emits laser beams, to generate point-cloud data of the surrounding environment. In an example, the subfigure 112 shows an exemplary point-cloud generated based on the LiDAR sensor. In some embodiments, the point-cloud includes (x, y, z) coordinates in a coordinate system and the intensity of the reflection of the laser beams received at the sensor.

For example, the point-cloud may be stored as a pixel array of four dimensions, with three dimensions corresponding to the spatial coordinates of the scanned surrounding area and one dimension representing a strength of the reflection sensed by the LiDAR sensors. In some embodiments, a multi-dimensional array may be used for storage of the point-cloud data, with three spatial dimensions, and additional dimensions corresponding to multiple sensors and their corresponding reflection map.

The flow diagram 100 includes a pre-processing step that takes the single-frame point-cloud from the LiDAR sensor and motion information from the Global Positioning System (GPS) unit and the Inertial Measurement Unit (IMU) (block 105) to register consecutive point-cloud frames into a common coordinate system, which may then be accumulated (block 110). The accumulated point-cloud (e.g. shown in subfigure 122) is typically much denser than the single-frame point-cloud.

The flow diagram 100 includes the curb detection module (block 130) that estimates features for a subset of the points in the accumulated point-cloud. In some embodiments, the features include the normal at each point, which is estimated by fitting a plane to the point and its nearby points within a certain range (referred to as a "point group"). In other embodiments, the features include the curvature of the point group, which is estimated as $\lambda_0/(\lambda_0+\lambda_1+\lambda_2)$, where $\lambda_0<\lambda_1<\lambda_2$ are the eigenvalues of the covariance matrix formed by the nearby points. In some embodiments, a k-dimensional tree may be constructed from the accumulated point-cloud to support faster, and more efficient, nearest neighbor searches.

The curb detection module then randomly selects some points as seeds to create clusters, and region-growth is performed from these seeds. In the region-growing process, a point cluster will check its neighboring points to see if they satisfy a criterion associated with height, the normal, and curvature. The points that satisfy the criterion will be added to the cluster, and may become new seeds that are used to expand the cluster. A cluster will be removed from the original accumulated point-cloud when it stops growing, and the curb detection module will start a new cluster from another random seed among the remaining points. In some embodiments, the process may terminate when the total number of remaining points from the original accumulated point-cloud drops below a certain threshold, resulting, for example, in subfigure 132.

In some embodiments, satisfying the criterion may correspond to all the points in a region being connected in some predefined sense. In an example, a smoothness requirement (or condition) needs a value of a certain metric computed for each point to be within some tolerance of an initial or average value. In another example, the criterion may depend on multiple metrics with varying numerical range requirements.

In some embodiments, a 4-connected neighborhood (Von Neumann neighborhood) may be used in the region-growing step. In other embodiments, a 8-connected neighborhood (Moore neighborhood) may be used to grow the region from the initially selected seed points.

The curb detection module relies on the assumption that the largest cluster close to the driving trajectory will always be the drivable area, e.g. the road surface. This assumption holds since the origin of the point-clouds (both the single-frame and accumulated versions) is the center of the LiDAR sensor, which is co-located with the vehicle and its driving trajectory, and provides very strong a priori knowledge about where the road surface will be. Thus, the curb detection module may extract the points that belong to the drivable area by selecting the cluster that contains the most points.

Figure 2:
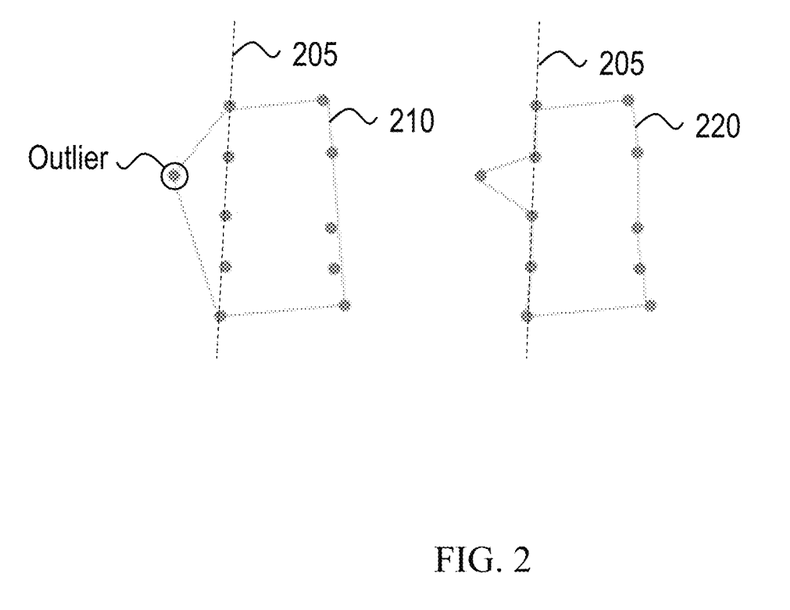
FIG. 2 shows an example of convex and concave hulls of a set of points.

The boundary of the road surface is typically the location of the curb. To obtain the boundary of the drivable area, the curb detection module may compute the concave hull of the largest cluster. FIG. 2 shows an example of a convex hull (210) and a concave hull (220) of a set of points. Using the concave hull for curb detection is more robust to outliers and noise than using the convex hull, as shown in FIG. 2. Therein, an outlying point may significantly skew the detection of the curb (205) if a convex hull is used (210), but has a minimal impact when employing a concave hull (220) in the computations. The concave hull computation is followed by the two curves on either side of the road surface being fit using, for example, the random sample consensus (RANSAC) method to find the left and right curbs of the road.

The flow diagram 100 includes a post-processing module (block 140) that uses the curves generated from multiple frames, and fuses that information based on their temporal continuity (to generate, for example, subfigure 142). In some embodiments, the post-processing model may smooth out the curb points using a b-spline fitting function.

Figure 3:
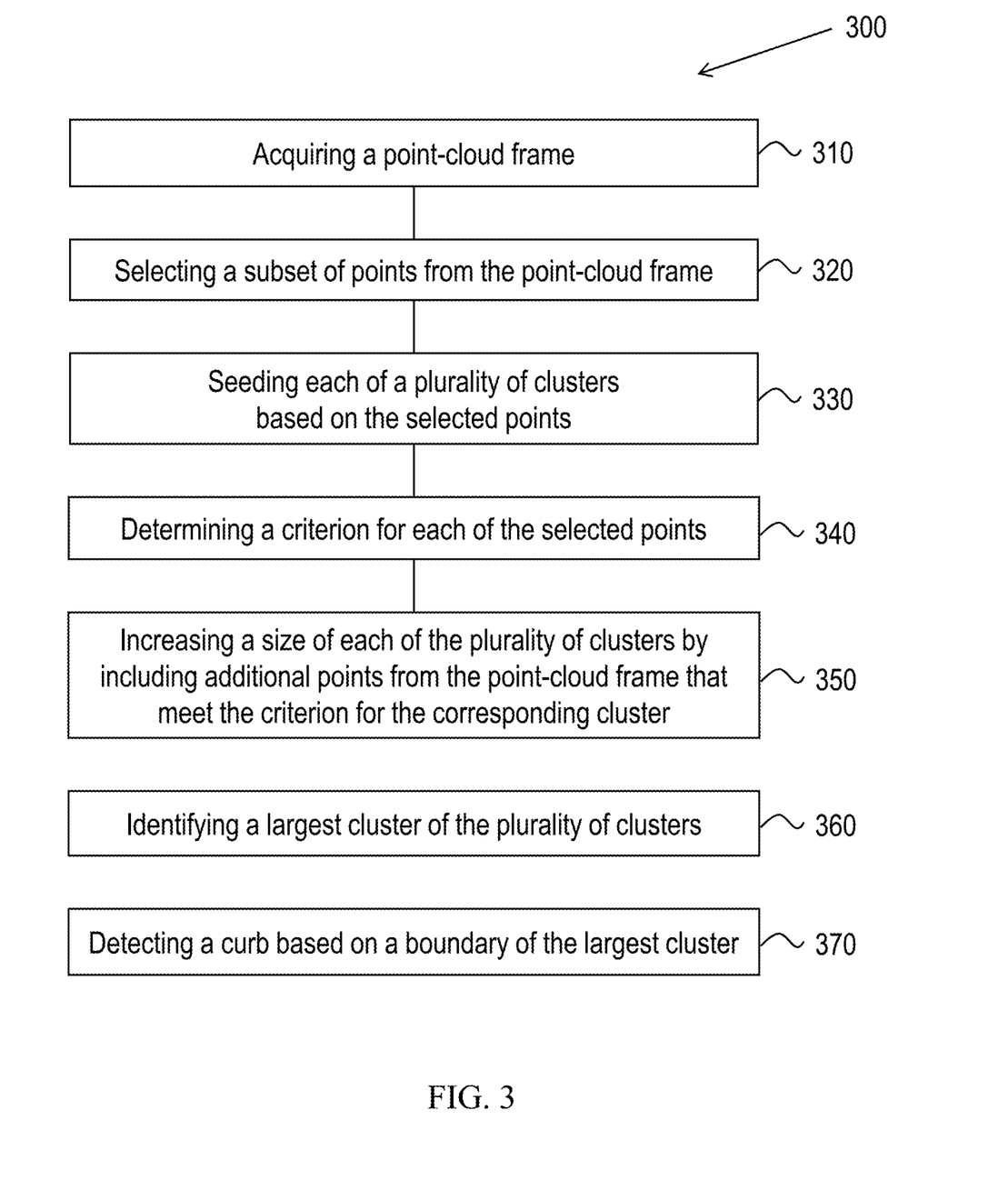
FIG. 3 shows a flowchart for an example method of for LiDAR-based curb detection.

FIG. 3 shows a flowchart for an example method 300 for LiDAR-based curb detection. The method 300 includes, at step 310, acquiring a point-cloud frame. In some embodiments, the point-cloud frame is acquired based on a scan of an area around a vehicle, and may include a description of an intensity of a reflection of the area around the vehicle. For example, the scan of the vehicle may be performed by a LiDAR sensor that is spinning a rate of 20 Hz. Due to the use of high frequency, high velocity waves for sensing reflections, the LiDAR is typically not affected by the speed of the vehicle, and may support vehicle speeds ranging from 5 miles per hour (mph) to 70 mph. In some embodiments, the LiDAR scanning is based on a rotation rate parameter, an image resolution parameter and/or a frame rate parameter.

In some embodiments, the point-cloud frame may be generated based on the accumulation of multiple single-frame point-clouds. As expected, the accumulated point-cloud frame is much denser than any individual single-frame point-cloud. This enables more robust curb detection, and pre- and post-processing, since noise effects are averaged out due to the accumulation.

The method 300 includes, at step 320, selecting a subset of points from the point-cloud frame, and further includes, at step 330, seeding each of a plurality of clusters based on the selected points, which are the preliminary steps of the region-growing method. The selection process may be implemented in a variety of different ways. For example, in some embodiments, the selected subset may be uniformly distributed throughout the 3D space represented by the point-cloud. In some embodiments, the subset of points may be a fixed pre-determined number (e.g., 10,000 points), and more points may be selected from an area that was detected previously to include a previous estimate of the curb. Advantageously, such a selection allows more computational power to be applied to the area that has a higher probability of including the border between the road surface and the curb. In some embodiments, curb detection may be performed periodically as the vehicle moves along a road, and the subset of points may be selected to be non-co-located compared to a previous selection. Advantageously, such a selection provides a thorough and uniform coverage of the surrounding area over a number of curb detections performed by the system.

The method 300 includes, at step 340, determining a criterion for each of the selected points. In some embodiments, the criterion may include a normal vector and a curvature, which may be computed for each of the selected points and based on neighboring points. In an example, the curvature may be computed as $\lambda_0/(\lambda_0+\lambda_1+\lambda_2)$, where $\lambda_0<\lambda_1<\lambda_2$ are the eigenvalues of the covariance matrix formed by the neighboring points.

The method 300 includes, at step 350, increasing a size of each of the plurality of clusters by including additional points from the point-cloud frame that meet the criterion for the corresponding cluster. The region-growing method used to increase the size of the clusters is a segmentation method that examines neighboring points (or pixels) of initial seed points and determines whether the point neighbors should be added to the region. The process is iterated on, in the same manner as general data clustering algorithms.

In some embodiments, and in the context of FIG. 1, the criterion may be referred to as a smoothness condition that is implemented using one or more features and corresponding thresholds or tolerances. For example, neighboring points that have feature values that are within a certain tolerance of the seed point feature values are added to that cluster.

The method 300 includes, at step 360, identifying, upon completion of the increasing step 350, a largest cluster of the plurality of clusters. Since the LiDAR sensor is co-located with the vehicle and its driving trajectory, there is very strong a priori knowledge, or a high statistical probability, that the largest cluster will correspond to the road surface, and be very close to the driving trajectory (e.g. within a foot, or within 2-20% of the width of the vehicle) or even enclose the driving trajectory. Thus, when the region (or cluster) growing operation is completed, the largest cluster is identified as the road surface. In an example, the region-growing operation may be terminated based on the number of points of the point-cloud frame that have not been considered. In another example, the stopping condition for the region-growing method may be the size of the largest cluster exceeding a certain threshold.

The method 300 includes, at step 370, detecting a curb based on a boundary of the largest cluster. The boundary of the largest cluster, which is typically the road surface, will be the curb location. In some embodiments, the method 300 includes smoothing the boundary of the largest cluster based on a spline function. In other embodiments, the method 300 further includes computing the concave hull of the largest cluster.

In some embodiments, the method 300 may further include determining whether any of the clusters include bounded regions of points, where each point in a bounded region does not meet the criterion. In other words, the region-growing method may have grown the largest cluster around another vehicle on the road, which results in a bounded region with feature values that different from the feature values of the largest (or road) cluster.

Since the bounded region includes points that do not meet the criterion, the method is able to correctly identify that these points are not representative of the curb, but rather of another object in the road (e.g. a vehicle), and the method 300 further includes either adding the points of the bounded region of points to the corresponding cluster, or correctly identifying them as not being part of the curb. This operation ensures that embodiments of the disclosed technology can accurately and robustly detect the curb.

In some embodiments, the movement of the object in the road may be tracked as the vehicle moves along the road. If curb detection is performed periodically, the tracking information may be leveraged to provide a priori information to the region-growing method, which would advantageously result in faster and more accurate processing.

Figure 4A:
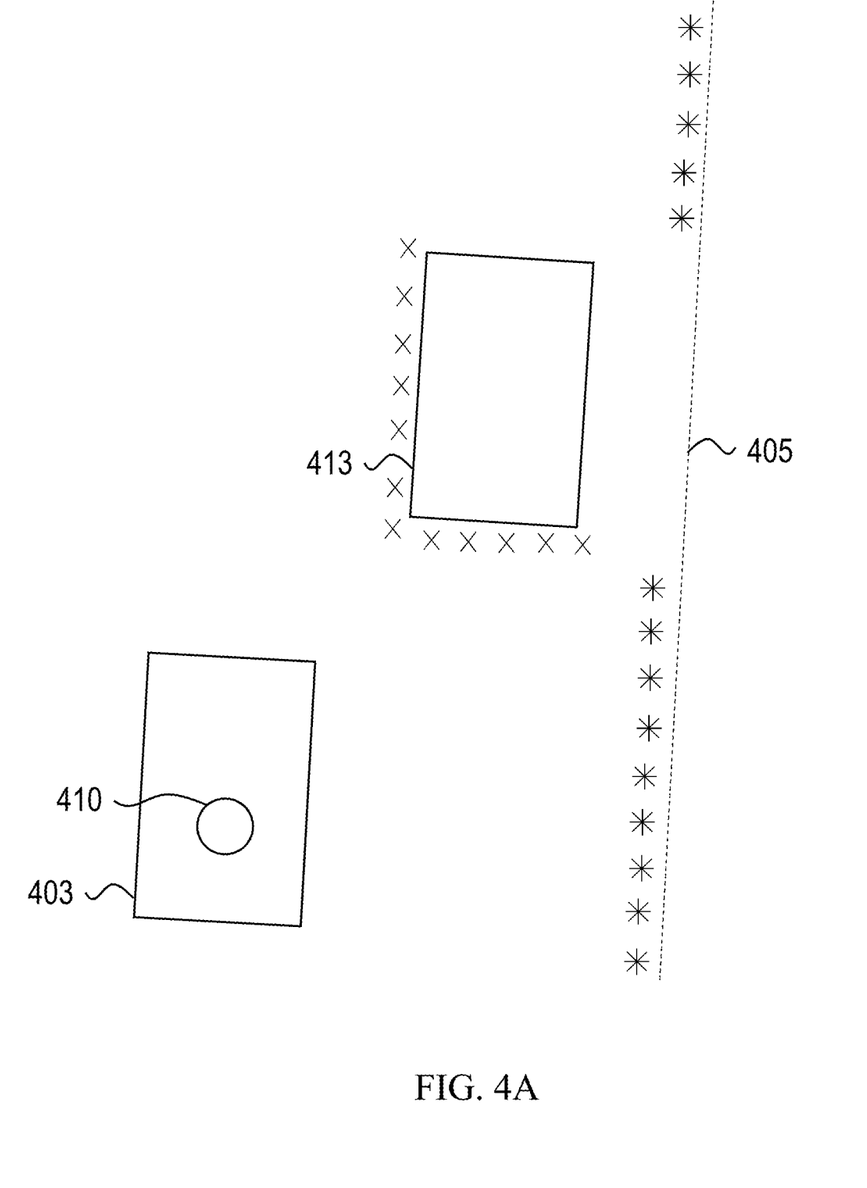
FIGS. 4A and 4B show examples of LiDAR-based curb detection in the presence of another vehicle on the road.
Figure 4B:
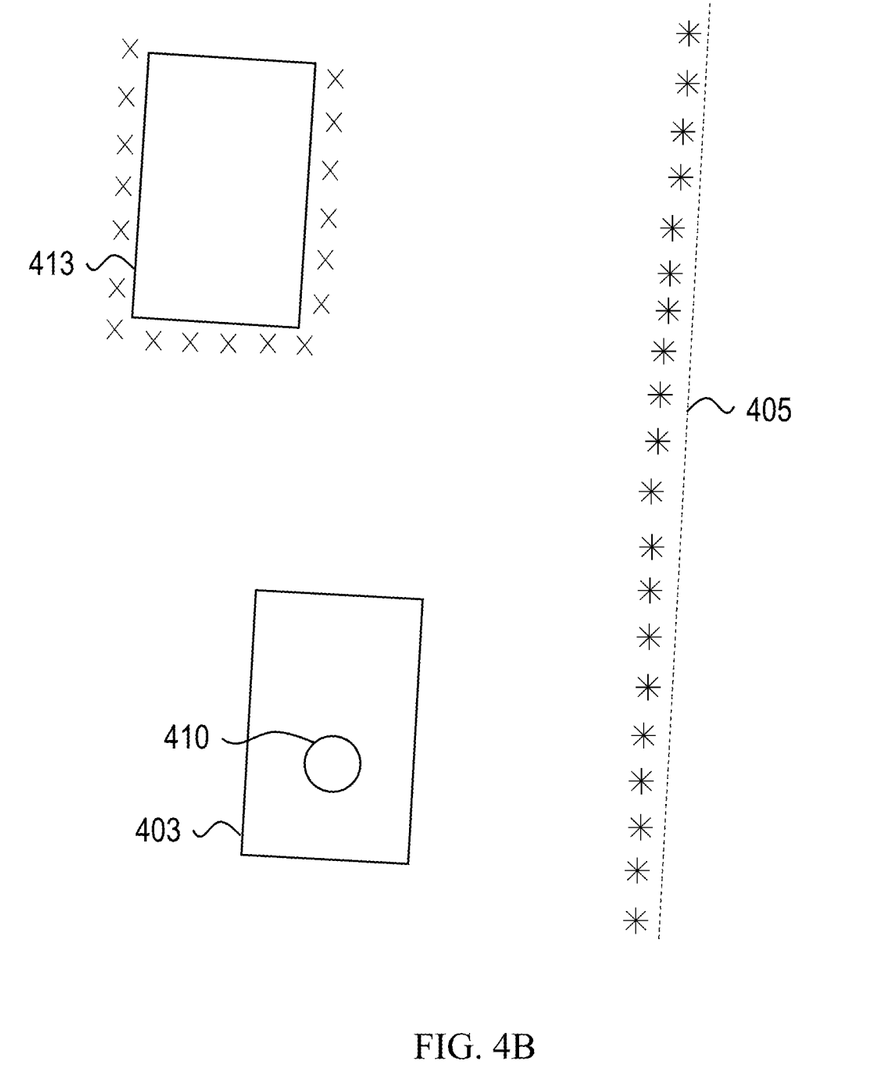

FIGS. 4A and 4B show examples of LiDAR-based curb detection in the presence of another vehicle on the road. Embodiments of the disclosed technology are advantageously able to accurately detect the curb in the presence of an obstruction such as another vehicle on the road. As shown in FIG. 4A, the ego-vehicle 403 (the term "ego-vehicle" is used to refer to autonomous vehicle that is the primary subject) that includes the LiDAR sensor 410 may be adjacent to another vehicle 413, which is closer to the curb 405 than the ego-vehicle. Due to the view-point of the ego-vehicle 403, the other vehicle 413 is detected as "an L-shape" (as shown by the "X" marks in FIG. 4A) and a portion of the curb is also detected (as shown by the "*" marks in FIG. 4A).

In some embodiments, the detected points corresponding to the vehicle (the "X" marks in FIG. 4A) may be removed from consideration, and the curve fitting may be applied to the detected points corresponding to the curb (the "*" marks in FIGS. 4A and 4B) in order to accurately identify the curb, including the portion that was occluded by the vehicle 413. For example, the curve fitting used to identify the curb may be similar to what is used in the post-processing module 140 in FIG. 1 (e.g. spline interpolation).

In some embodiments, curve fitting the detected points corresponding to the curb (the "*" marks in FIG. 4A) may not be viable since the gap may be too large for a curve fitting algorithm to accurately overcome. In this scenario, some embodiments may combine the results from multiple runs of the detection algorithm. For example, over multiple runs, the area occupied by another vehicle in one run may be free in another run. Thus, the gaps in the curb may be filled in by combining the results over multiple runs. Additionally, any curb detection false positives may be eliminated by using majority voting, mean filtering and/or median filtering over results from the multiple runs.

FIG. 4B shows a scenario in which the ego vehicle 403 is positioned closer to the curb 405 than the other vehicle 413, and the LiDAR sensor 410 is able to distinguish both the other vehicle as well as the curb. In this scenario, as discussed previously, a bounded region that includes points that do not meet the criterion correspond to the other vehicle 413, and may be removed from consideration. As shown in the context of FIGS. 4A and 4B, embodiments of the disclosed technology are able to accurately and robustly detect the curb in the presence of other vehicles or occlusions on the road.

Figure 5:
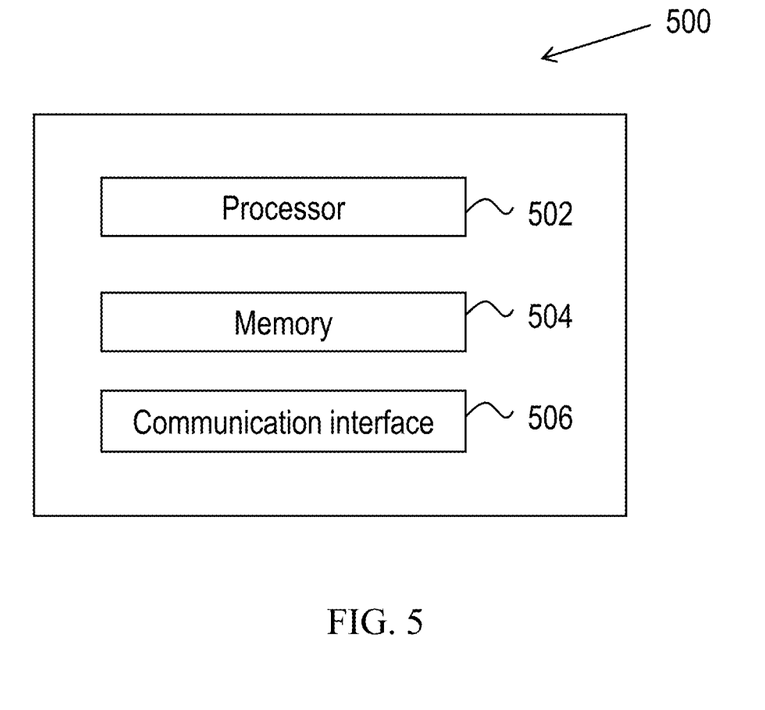
FIG. 5 shows an example of a hardware platform that can implement some techniques described in the present document.

FIG. 5 shows an example of a hardware platform 500 that can be used to implement some of the techniques described in the present document. For example, the hardware platform 500 may implement the method 300 or may implement the various modules described herein. The hardware platform 500 may include a processor 502 that can execute code to implement a method. The hardware platform 500 may include a memory 504 that may be used to store processor-executable code and/or store data. The hardware platform 500 may further include a communication interface 506. For example, the communication interface 506 may implement one or more of the communication protocols (LTE, Wi-Fi, and so on) described herein.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for detecting road features, comprising:
   acquiring, based on a scan of an area around a vehicle, a point-cloud frame that comprises a description of an intensity of a reflection of the area around the vehicle;
   selecting a subset of points from the point-cloud frame;
   seeding each of a plurality of clusters based on the selected points;
   determining a criterion for each of the selected points;
   increasing a size of each of the plurality of clusters by including additional points from the point-cloud frame that meet the criterion for the corresponding cluster;
   identifying, upon completion of the increasing step, a largest cluster of the plurality of clusters; and
   detecting a curb based on a boundary of the largest cluster.

2. The method of claim 1, wherein the criterion is at least one feature of each of the additional points meeting a threshold associated with the corresponding cluster.

3. The method of claim 2, wherein the at least one feature comprises a normal vector at each of the additional points and a curvature of a subset of the additional points.

4. The method of claim 3, wherein the curvature is computed as $\lambda_0/(\lambda_0+\lambda_1+\lambda_2)$, where $\lambda_0<\lambda_1<\lambda_2$ are eigenvalues of a covariance matrix based on the subset of the additional points.

5. The method of claim 1, wherein the point-cloud frame is an accumulated point-cloud, and wherein acquiring the point-cloud frame comprises:
   scanning the area around the vehicle using a light detection and ranging (LiDAR) sensor;
   generating, based on the scanning step, a plurality of single-frame point-clouds; and
   performing an accumulation operation on the plurality of single-frame point-clouds to generate the point-cloud frame.

6. The method of claim 5, wherein generating the plurality of single-frame point-clouds is further based on a Global Positioning System (GPS) sensor and an inertial measurement unit (IMU), and wherein each of the plurality of single-frame point-clouds are generated in a common coordinate system.

7. The method of claim 5, wherein the scanning is based on one or more of a rotation rate parameter, an image resolution parameter and a frame rate parameter.

8. The method of claim 1, wherein the point-cloud frame further comprises a three-dimensional geometry of the area around the vehicle, and wherein each point in the point-cloud frame comprises (x,y,z) coordinates and an intensity value.

9. The method of claim 1, further comprising:
smoothing the boundary of the largest cluster based on a spline function.

10. The method of claim 1, wherein detecting the curb is further based on a concave hull of the largest cluster.

11. The method of claim 1, further comprising:
determining whether any of the plurality of clusters comprises a bounded region of points, wherein each point of the bounded region of points does not meet the criterion; and
adding the points of the bounded region of points to the corresponding cluster.

12. An apparatus for detecting road features, comprising:
a processor; and
a memory comprising processor executable code, the processor executable code when executed by the processor causes the processor to:
acquire, based on a scan of an area around a vehicle, a point-cloud frame that comprises a description of an intensity of a reflection of the area around the vehicle;
select a subset of points from the point-cloud frame;
seed each of a plurality of clusters based on the selected points;
determine a criterion for each of the selected points;
increase a size of each of the plurality of clusters by including additional points from the point-cloud frame that meet the criterion for the corresponding cluster;
identify, upon completion of the increasing step, a largest cluster of the plurality of clusters; and
detect a curb based on a boundary of the largest cluster.

13. The apparatus of claim 12, further comprising:
a light detection and ranging (LiDAR) sensor configured to generate the scan of the area around the vehicle, wherein the processor executable code when executed by the processor further causes the processor to:
generate, based on the scanning step, a plurality of single-frame point-clouds; and
perform an accumulation operation on the plurality of single-frame point-clouds to generate the point-cloud frame.

14. The apparatus of claim 13, further comprising:
a Global Positioning System (GPS) sensor; and
an inertial measurement unit (IMU),
wherein generating the plurality of single-frame point-clouds is further based on the GPS sensor and the IMU, and wherein each of the plurality of single-frame point-clouds are generated in a common coordinate system.

15. The apparatus of claim 12, wherein the point-cloud frame further comprises a three-dimensional geometry of the area around the vehicle, and wherein each point in the point-cloud frame comprises (x,y,z) coordinates and an intensity value.

16. The apparatus of claim 12, wherein the processor executable code when executed by the processor further causes the processor to:
determine whether any of the plurality of clusters comprises a bounded region of points, wherein each point of the bounded region of points does not meet the criterion; and
add the points of the bounded region of points to the corresponding cluster.

17. A non-transitory computer-readable medium storing a program causing a computer to execute a process, the process comprising:
acquiring, based on a scan of an area around a vehicle, a point-cloud frame that comprises a description of an intensity of a reflection of the area around the vehicle;
selecting a subset of points from the point-cloud frame;
seeding each of a plurality of clusters based on the selected points;
determining a criterion for each of the selected points;
increasing a size of each of the plurality of clusters by including additional points from the point-cloud frame that meet the criterion for the corresponding cluster;
identifying, upon completion of the increasing step, a largest cluster of the plurality of clusters; and
detecting a curb based on a boundary of the largest cluster.

18. The non-transitory computer-readable medium of claim 17, wherein the criterion is at least one feature of each of the additional points meeting a threshold associated with the corresponding cluster.

19. The non-transitory computer-readable medium of claim 18, wherein the at least one feature comprises a normal vector at each of the additional points and a curvature of a subset of the additional points.

20. The non-transitory computer-readable medium of claim 17, wherein the point-cloud frame is an accumulated point-cloud, and wherein acquiring the point-cloud frame comprises:
scanning the area around the vehicle using a light detection and ranging (LiDAR) sensor;
generating, based on the scanning step, a plurality of single-frame point-clouds; and
performing an accumulation operation on the plurality of single-frame point-clouds to generate the point-cloud frame.

* * * * *